UNITED STATES PATENT OFFICE.

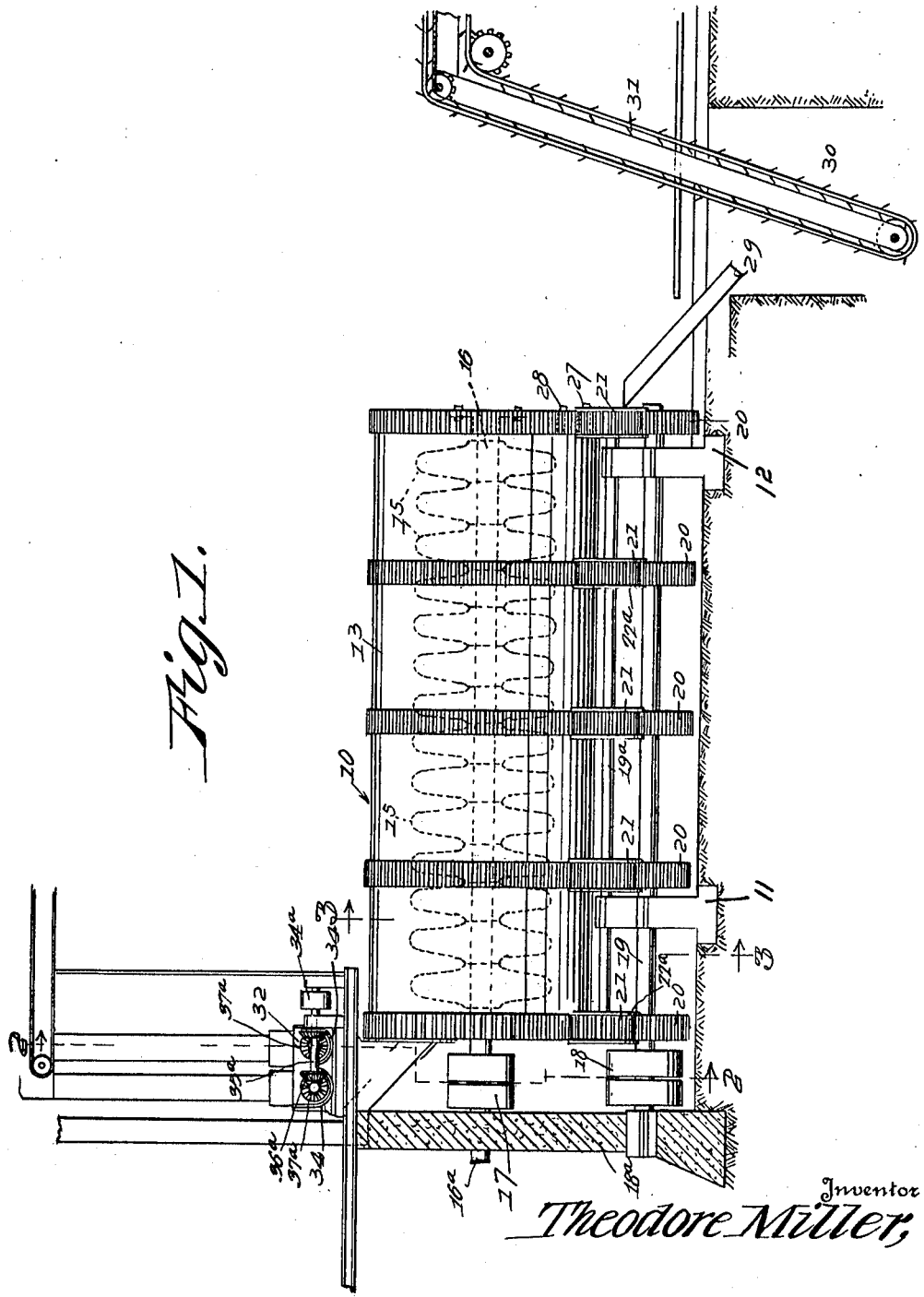

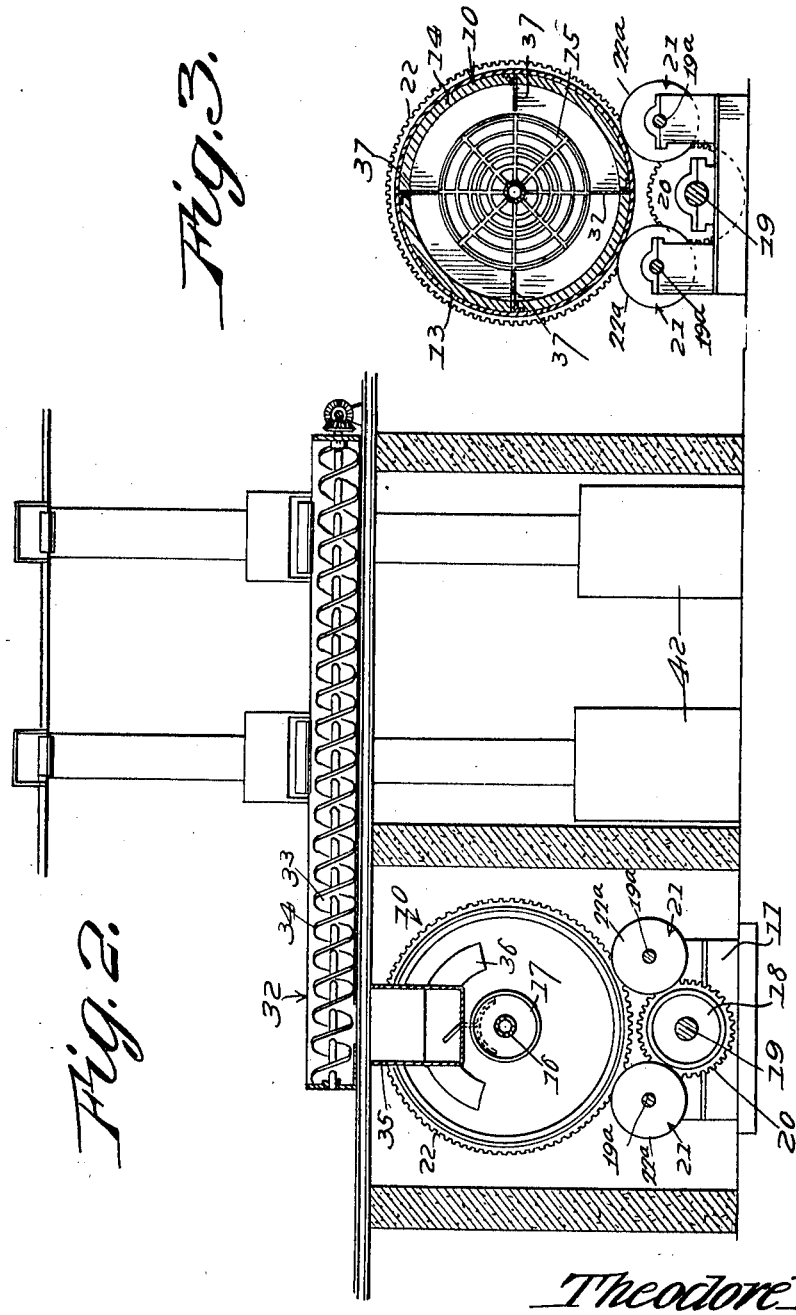

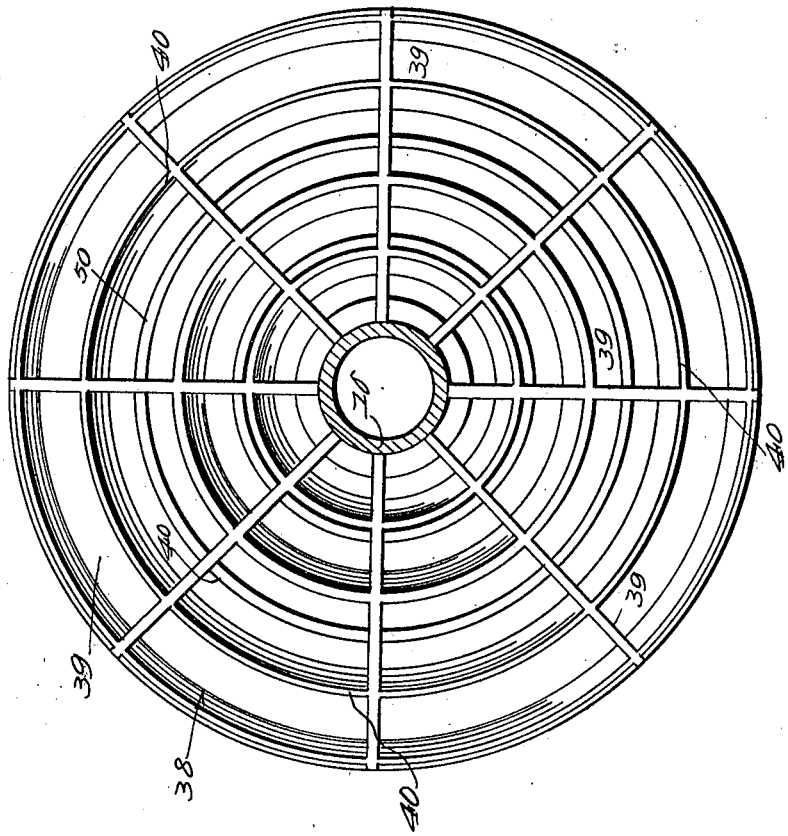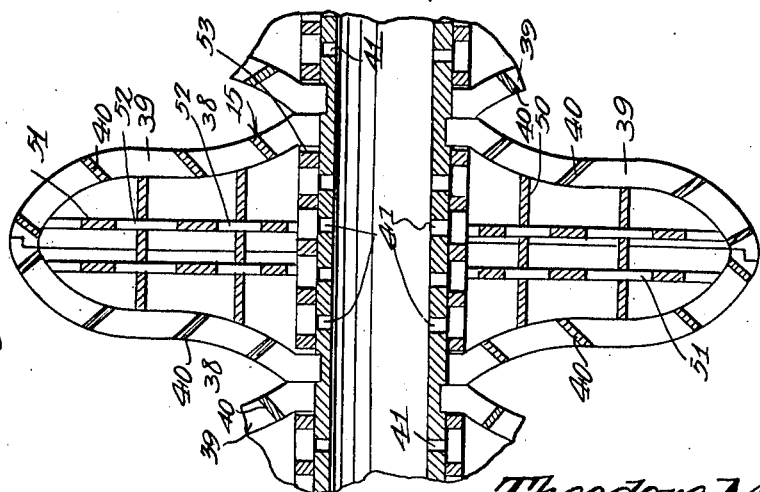

THEODORE MILLER, OF WACO, TEXAS.

CONVERTER AND SMELTER.

1,314,348.　　　　Specification of Letters Patent.　　Patented Aug. 26, 1919.

Application filed March 22, 1918. Serial No. 224,026.

*To all whom it may concern:*

Be it known that I, THEODORE MILLER, a citizen of the United States, residing at Waco, in the county of McLennan and State of Texas, have invented new and useful Improvements in Converters and Smelters, of which the following is a specification.

The object of the invention is to provide a simple, relatively inexpensive and efficient converter and smelter mechanism for use in connection with a crushing apparatus, and designed for the employment of liquid, gaseous or solid fuel, in powdered form, under such conditions as to insure the most satisfactory reduction of the material and drainage or removal from the converter.

Further objects and advantages will appear hereinafter, it being understood that the illustrated embodiment is susceptible to changes in form, proportions, and details, and of use as a unit or in multiple, within the scope of the appended claims, without departing from the spirit of the invention.

In the drawings—

Figure 1 is a side view of the apparatus, with the primary combustion chambers shown in dotted lines.

Fig. 2 is a vertical sectional view on the plane indicated by line 2—2 of Fig. 1.

Fig. 3 is a section on line 3—3 of Fig. 1.

Fig. 4 is a sectional view in detail of a combustion chamber.

Fig. 5 is an inner face view of one member of a combustion chamber.

Essentially the apparatus, which is designed to receive crushed ore from suitable devices and through appropriate means, consists of a revoluble converter 10 of cylindrical form mounted upon terminal supports 11 and 12. On the interior this converter which comprises an outer shell 13 is provided with a refractory lining 14, and houses a series of primary or initial combustion units 15, which are in communication with a feed pipe 16, the latter constituting the axial shaft of the cylinder. Means is provided for rotating the cylinder and the combustion chambers in opposite directions, and in order that the cylinder may be permitted to revolve, the terminal supports on which it is carried also support a cradle by which the cylinder is directly supported, the cradle aside from supporting the cylinder providing means for rotating the same.

A shaft 19 is journaled in appropriate bearings carried by the two supports 11 and 12, and this shaft has mounted thereon the gear wheels 20. There are mounted for rotary movement in appropriate bearings also carried by the supports 11 and 12, the shafts 19ª, but the bearings for the latter stand in a higher plane than do the bearings for the shaft 19, and further these bearings are positioned adjacent the sides of the supports 11 and 12, and thus provide for the shafts 19ª lying one on either side of the shaft 19, but above the latter. The shafts 19ª carry bed pinions 21, these latter meshing with the gears 20.

The cylinder 10 is directly supported upon these bed pinions 21 and carries the gear rings 22, which mesh with the pinions 21. The bed pinions are formed on both sides with flanges 22ª, which shroud the teeth of the pinions and project radially beyond the edges of the teeth so that they may overlie the ends of the teeth of the gears 20 and gear rings 22. It will thus be observed that the cylinder 13 is precluded from longitudinal movement relative to the bed pinions, and the latter precluded movement in the direction of the length of shaft 19. The latter, of course, is mounted for rotary movement in its attendant bearings but is precluded from longitudinal movement, and, therefore, the cylinder and its cradle are sustained by the supports 11 and 12 in such a manner as only to permit rotary movement of the cylinder.

The interior end of the shaft 19 is journaled in an appropriate bearing in the wall 18ª, adjacent to which the converter stands and between this wall and the first gear 20 it carries the pulleys 18, one of which may be employed as a means for driving the shaft 19 by being belted or otherwise connected to a suitable driving device such as an electric motor.

At that end of the cylinder remote from the wall 18ª there is provided a metal tap or discharge orifice 27, positioned near the periphery of the cylinder and adjacent to this discharge orifice there is located the slag notch 28. When the cylinder is so positioned that the discharge orifice 27 is lowermost, the contents of the cylinder may be deposited into the chute 29 and thence discharged into a pit 30 from which they may be removed by conveyer mechanism 31.

The cylinder is supplied by a feed conveyer generally designated 32. This feed conveyer has a pair of feed screws 33, rotatably mounted in troughs, 34, the troughs communicating with a chute which in turn communicates with an annular feed opening 36 at the inlet end of the cylinder—that is, the end adjacent the wall 18ᵃ. The conveyer screws 33 are put in motion through the medium of a pulley 34ᵃ, which is carried on a shaft 35ᵃ, the shaft being journaled in appropriate bearing supports and carrying the bevel gears, 36ᵃ, the latter meshing with bevel gears 37ᵃ, which are connected with the conveyer screws 33. The conveyer is designed to receive ore prepared in the crushers or pulverizers indicated at 42. These pulverizers are of a conventional type, and after the ore has been prepared in the presence of water or the like it is conducted to the conveyer troughs and thence fed into the chute 35 by the feed screws 33. The crushers 42 are arranged each to deposit its prepared ore in one of the conveyers 32.

The combustion chambers 15 of which any desired number may be employed and which also perform the function of agitators or stirrers, in that they are rotated in a reverse direction to the converter cylinder are of refractory material. They are constructed of twin disks 38 perforated or orificed as indicated at 39 to form intermediate veins 40. They are further formed with annular members 50 concentric with their axis of rotation and these annular members 50 divide the combustion chambers radially. Orificed or open disks 51 are formed with the disks 38 and the orifices 52 in said disks, provide means whereby the divisions of the combustion chambers effected by the annular members 50 are placed in communication with the other. The combustion units 15 are mounted on the hollow shaft 16 hereinbefore referred to, and each of them is formed with a thimble 53, which surrounds and is securely attached to said hollow shaft, the thimble having perforations to register with perforations 41 formed in the shaft, so that appropriate burners may be mounted in the perforations formed in the thimble to receive fuel through the perforations 41, formed in the shaft. Such burners are obviously designed for the particular kind of fuel used with the invention.

The hollow shaft 16 is journaled in both ends of the cylinder 13 and is closed at the forward end of the cylinder, the shaft at the rear end of the cylinder projecting through the latter and passing through the wall 18ᵃ, having mounted upon it between the wall and the end of the cylinder the pulleys 17 by means of which a belt may be employed to operatively connect the shaft 16 with the shaft 19. Obviously this belt must be a crossed belt in order that the combined combustion chambers and stirrers may be rotated in the reverse direction to the cylinder. That end 16ᵃ of the hollow shaft 16 is connected with a source of fuel supply so that liquid, gaseous or solid fuel in powdered form may be fed into the hollow shaft 16 by any appropriate means. This fuel, of course, passes to the burners through the perforations 41 and the flames thus resulting project through the orifices 39 between the veins 40, the disks 51 and their orifices 52 causing the flames from the innermost burners to be projected through the outermost orifices 39. Obviously the innermost annular members 32 would confine the flames to the orifices 39 nearest the shaft, but the disks 51 permit the flame from the innermost burners to pass to the outside of the innermost annular member 52 and thence laterally out of the perforations 39 adjacent that annular member. In the same way the outer of the annular members 52 permits the passage of the flame to the outermost orifices 39. Hence, the flames are practically uniformly distributed over the whole outer surface of the combustion chambers 15. Therefore, when the cylinder is supplied with a quantity of ore and put in motion by the turning of the shaft 19, the combustion chambers are rotated simultaneously with the cylinder but in the opposite direction thereto. The flames from these burners or combustion chambers are directed against the metal of the charge and obviously reduce the same, the veins 49 of the burners the while stirring and agitating the charge. This construction provides for the subjecting of the metal of a charge to a reducing heat while the metal is being effectively agitated to secure uniformity of treatment and economy of production, the cylinder 15 being provided with radially disposed agitators, which coöperate with the combustion chambers in agitating the charge as the cylinder is revolved. It will be seen that the arrangement of burner chambers provides for the distribution of fuel throughout the cylinder and avoids the necessity of using coke or charcoal for fuel, as in ordinary practice.

Having described the invention, I claim:—

1. A converter having a revoluble cylinder within which is arranged a series of revoluble, burner-housing, refractory combustion chambers.

2. A converter having a revoluble cylinder, a series of revoluble burner-housing, refractory combustion chambers, and means for rotating said cylinder and chambers in opposite directions.

3. A converter having a revoluble cylinder provided with interior agitators, a series of revoluble, burner-housing, refractory combustion chambers, disposed axially of the cylinder, means coaxial with the cylinder for feeding fuel, and means for rotating the cylinder and chambers in opposite directions.

4. A converter having a revoluble cylinder provided with a hollow shaft fitted with fuel vents, combustion chambers carried by said shaft and housing the burner vents, said chambers having orificed walls, and means for rotating the cylinder and shaft in opposite directions.

5. A converter having a revoluble cylinder containing a series of axially arranged hollow refractory agitators provided with interior burner vents, and means for supplying fuel continuously to said vents.

6. A converter embodying a revoluble cylinder, an axially arranged series of primary combustion chambers disposed within the cylinder, and a common rotating and pulley supply means for said chambers.

7. A converter embodying a revoluble cylinder, a plurality of orificed disks axially arranged within the cylinder, the disks being assembled in pairs to provide combustion chambers, and a common pulley supply means and rotating means for the combustion chambers, the disks comprising each combustion chamber having means to provide for the uniform distribution of the flames over the surfaces of the disks for action on the contents of the cylinder.

8. A converter embodying a revoluble cylinder, a series of axially arranged combustion chambers disposed in the cylinder, means for admitting fuel to the combustion chambers, and means for rotating both the combustion chambers and the cylinder, whereby the former perform the functions of stirrers as well as heating elements for the contents of the cylinder.

In testimony whereof I affix my signature.

THEODORE MILLER.

Copies of this patent may be obtained for five cents each, by addressing the "Commissioner of Patents, Washington, D. C."